United States Patent Office 3,780,036
Patented Dec. 18, 1973

3,780,036
ALKYLTHIOCARBONATES OF S-DIALKYL-
AMINO HALOTRIAZINES
Pierre Prognon, Portet-sur-Garonne, Robert Scuflaire and
Francois Mathey, Ballancourt-sur-Essone, and Oleg
Grysckiewic-Trochimowski, La Feret-Alais, France, assignors to Azote et Produits Chimiques S.A., Paris,
France
No Drawing. Filed Mar. 10, 1972, Ser. No. 233,710
Claims priority, application France, Mar. 10, 1971,
7108243
Int. Cl. C07d 55/46
U.S. Cl. 260—249.5                           7 Claims

ABSTRACT OF THE DISCLOSURE

Alkylthiocarbonates of S-dialkylamino halotriazines

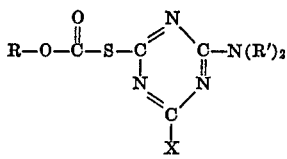

wherein

X is a halogen, preferably bromine and especially chlorine;
R is a linear or branched alkyl group of 1 to 12 carbon atoms, preferably of 1 to carbon atoms;
R' is a linear or branched alkyl group of 1 to 5 carbon atoms; and where
R and R' can be the same or different, and methods for their preparation, and methods of using same as pesticides.

BACKGROUND OF THE INVENTION

Field of the invention

This invention relates to new thiocarbonic compounds having a halogenated triazine ring, to their preparation and use as pesticidal ingredients. More particularly, this invention relates to alkylthiocarbonates of S-dialkylamino halogenated triazines.

Description of the prior art

A wide variety of compounds have been described which exhibit pesticidal activity against insects and fungi. However, many of these compounds are limited in their effects on particular pests when used in non-phytotoxic amounts. Furthermore, most prior art pesticides are dissolved or easily washed off of leaf surfaces by rain or other watering thereby limiting the time period over which they effectively function and necessitating frequent reapplications after watering.

Another drawback of many prior art pesticidal compounds is their limited solubility in various solvents, particularly in organic solvents such as petroleum ether and the like. Since many pesticides are commonly applied via an organic solvent carrier, the necessity of using particular or expensive solvents can substantially increase the cost of application.

A further drawback of many prior art pesticide compounds is that they often require extensive purification following their preparation in order to isolate a pesticidally active fraction.

SUMMARY OF THE INVENTION

Accordingly, it is an object of this invention to provide pesticidally active compounds and methods of preparing them.

Another object of this invention is to provide pesticidally active compositions and methods of using them.

A further object of this invention is to provide pesticidally active compounds which are readily applied on a large scale and resistant to washing off by precipitation.

An additional object of this invention is to provide pesticidal compounds and compositions which are non-phytotoxic when used in pesticidally effective amounts.

A more specific object of this invention is to provide novel alkylthiocarbonates of S-dialkylamino halotriazines and methods for their preparation and use.

Briefly, these and other objects, features, and advantages of the present invention are attained in one aspect by providing alkylthiocarbonates of S-dialkylamino halotriazines of Formula I:

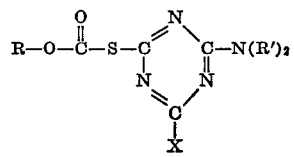

Formula I wherein

X is a halogen, preferably bromine and especially chlorine;
R is a linear or branched alkyl group of 1 to 12 carbon atoms, preferably of 1 to 5 carbon atoms;
R' is a linear or branched alkyl group of 1 to 5 carbon atoms; and where
R and R' can be the same or different.

The thiocarbonic compounds of Formula I are prepared by reacting an alkali-metal alkylthiocarbonate of the formula ROCOSM with a dialkylamino dihalotriazine of Formula II:

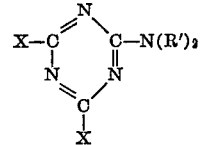

Formula II wherein X, R and R' have the same meanings given above and M is an alkali metal, preferably Na or K. The dialkylamino dihalotriazine can be prepared by known methods, for example, by reacting cyanuryl chloride with a dialkylamine having the alkyl group desired in the final product.

The reaction between the alkali-metal alkylthiocarbonate and the dialkylamino dihalotriazine is usually conducted in an inert organic solvent or solvent mixture which does not react with the reaction products, preferably in an aprotic organic solvent such as, for example, dimethylformamide or preferably tetrahydrofuran. The reaction takes place under ambient temperature and pressure. Slight heating, for example, to between about 30 and 50° C. can be employed in order to accelerate the reaction rate. When the reaction is completed, the formed alkali-metal halide is separated and the solvent is removed, preferably by evaporation at room temperature under reduced pressure. The compounds thus obtained usually still contain, as impurity, a certain proportion of unreacted triazine. In order to improve the overall yield, these impure compounds are therefore recycled to react with fresh alkali metal alkylthiocarbonate.

These thiocarbonic compounds are more or less viscous liquids; they are substantially colorless and practically insoluble in water but soluble in virtually all common organic sovents, including petroleum ether, various alcohols such as for example xylol, methanol, isopropanol, heavy and light aromatic hydrocarbons.

Specific examples of compounds of this invention include methyl thiocarbonate of S-dipentylaminochlorotriazine, lauryl thiocarbonate of S-diamylaminochlorotriazine, methyl thiocarbonate of S-dimethylaminochlorotriazine, lauryl thiocarbonate of S-dimethylaminochlorotriazine, isopropyl thiocarbonate of S-dimethyl-, of S-diethyl-, of S-diisopropyl- and of S-di-n-butylaminochlorotriazine.

The crude products thus obtained can be used directly as such is pesticidal compositions, but they are preferably further purified by conventional methods such as filtration and redissolution.

These thiocarbonic derivatives of S-dialkylamino halotriazines show most interesting properties in the pesticidal field. They can be used with success as insecticides and/or fungicides. For this application, they can be applied alone, but they are preferably used as the pesticidally active ingredient in either solid or liquid compositions, pastes, or suspensions prepared by known methods. For example, solid compositions can be prepared by absorbing or adsorbing the active thiocarbonic derivative in or on an inert finely divided carrier such as talc, clay, gypsum, diatomaceous earth. A component which improves adhesion such as lignosulfonate, glycerophthalic resin, vinylic resin and the like can also be introduced into such a solid composition, and is generally used in an amount from 0.5 to 10% by weight of the total composition. Liquid compositions are generally prepared as aqueous emulsions or emulsion concentrates. Aqueous emulsions generally contain from 0.01 to 85% by weight of the active compound, preferably from 5 to 80% by weight. Emulsion concentrates generally contain 0.01 to 85% by weight of the active compound, preferably from 5 to 80% by weight. They contain the active ingredient optionally dissolved in a small amount of a non-toxic organic solvent, an anionic, cationic, or non-ionic emulsifying agent such as, for example, an alkylenesulfonate, fatty acid ester, polyalkyleneglycol or the like and, if necessary, a reagent which improves the adhesion such as described hereinabove or an additive which is known to improve the spraying characteristics such as, for example, a quarternary ammonium compound, a fatty acid soap, an amine and the like may also be added.

When the active ingredient is to be used as an insecticide, it is also possible to prepare an organic solution of the thiocarbonic compound of the invention. In this case, one of the non-toxic solvents generally used in pesticidal formulations is used such as, for example, kerosene or any other hydrocarbon having suitable viscosity and volatility. This liquid composition optionally contains, in addition, an emulsifying agent such as exemplified hereinabove. Such formulations suitable for direct application generally contain 0.01 to 85% by weight of the active compound, preferably from 5 to 80% by weight. Of course, concentrated solutions to be diluted prior to application can also be used. These thiocarbonic compounds can also be dissolved in liquefied gases such as halogenated lower aliphatic hydrocarbons in order to be applied from aerosol bombs containing these solutions. Halogenated lower aliphatic hydrocarbons suitable for such applications include but are not limited to the fluorocarbon products found under the trademark "Freons." Other aerosol propellants include butane, nitrogen monoxide $N_2O$, carbon dioxide $CO_2$. The total amount of the active compound employed in these compositions is a pesticidally effective amount and generally ranges from 0.01 to 85% by weight, and preferably, between 5 and 80% by weight of the total composition. More particularly, insecticidally effective amounts of the active compounds as actually applied generally range from 50 to 1000 mg./m.$^3$, preferably from 100 to 700 mg./m.$^2$. Likewise, fungicidally effective amounts of the active compounds as actually applied to fields crops generally range from 20 g. to 4 kg. per acre, preferably from 200 g. to 3.4 kg. per acre. It will be appreciated that the actual preferred amounts of active compound used will vary in accordance with the specific compound being utilized, the particular composition formulated, the mode of application, and the particular crop and pest being treated. Optimal application rates for a given set of conditions can be readily determined by those skilled in the art.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, unless otherwise indicated, all percentages are by weight.

DETAILED DISCUSSION OF THE INVENTION

Example 1

This example illustrates the preparation of isopropyl thiocarbonate of S-dimethylaminochlorotriazine. For this preparation, 19.3 gms. (0.1 mole) of dimethylaminodichlorotriazine were mixed in a flask with 15.8 gms. (0.1 mole) of potassium isopropylthiocarbonate, and mixed in 800 ml. of anhydrous tetrahydrofuran. The mixture was agitated and heated at 45–50° C. for two hours, after which the potassium chloride crystals which formed were filtered off and the solvent was removed under reduced pressure. The raw product thus obtained was recycled to react again with 2.5 gms. of potassium isopropylthiocarbonate in 200 ml. of anhydrous tetrahydrofuran in order to use the unreacted dimethylaminodichlorotriazine which is present as impurity in the raw product. The reaction took place with agitation for 18 hours at 40–45° C., after which the crystallized potassium chloride was filtered off and the solvent was removed under reduced pressure. The mixture was then redissolved in 200 ml. of petroleum ether, filtered, and the petroleum ether was removed under reduced pressure.

Ten grams of a colorless viscous liquid was recovered containing 10.2% sulphur, 18.85% nitrogen and 12.45% chlorine. Its refractive index $n_D^{20}$ is 1.5519.

Example 2

The procedure of Example 1 was followed except that di-n-butyl and diisopropylaminodichlorotriazine respectively were substituted for dimethylaminodichlorotriazine. The isopropylthiocarbonates of S-dibutylamino chlorotriazine (refractive index $n_D^{20}$ 1.5312) and of S-diisopropylaminochlorotriazine (refractive index $n_D^{20}$ 1.5405) respectively, were obtained.

Example 3

To prepare the isopropylthiocarbonate of S-diethylaminochlorotriazine, the diethylaminodichlorotriazine was first prepared by reacting under ambient conditions 1 mole of cyanurylchloride (184.5 g.) over 1 mole of diethylamine (73 g.) and 1 mole of triethylamine (101 g.) dissolved in ether. The precipitated triethylamine hydrochloride was filtered off, and the diethylaminodichlorotriazine was recovered in the ether solution.

This intermediate product is a pasty solid which contains 31.10% chlorine (percent calculated: 31.67) and 24.77% nitrogen (percent calculated: 25.34). It was cooled to between 0 and −10° C., and mixed with an equimolar proportion of potassium isopropylthiocarbonate in anhydrous tetrahydrofuran. The reaction was further performed as in Example 1.

The liquid obtained after purification boils (with decomposition) at 135–140° C. under 0.8 mm. Hg. Analysis of this compound gives the following results:

| Percent: | Calculated | Found |
|---|---|---|
| Sulphur | 10.5 | 10.36 |
| Nitrogen | 18.39 | 18.52–18.04 |
| Chlorine | 11.66 | 12.03 |

Example 4

The isopropylthiocarbonate of S-diethylaminochlorotriazine prepared in the preceding example was tested for insecticidal activity as follows.

The active product was dissolved in acetone to form a solution containing 0.5% by weight thereof. Approximately 4–5 ml. of this solution was then sprayed into cylindrical containers of 30 cm. high, having a useful capacity of approximately 6 liters. The bottom of these containers was covered with a white filter paper. After spraying, a lump of sugar and a cupel containing cotton-wool soaked with distilled water were placed on the filter paper, in order to provide survival means for the insects during the experiment which took place at 22±1° C. Fifteen normal size domestic flies (*Musca domestica*) were then introduced into each container. In each test, a control blank was also observed without insecticidal product.

This experiment showed that at a 150 mg./m.$^3$ concentration, isopropylthiocarbonate of S-diethylaminochlorotriazine has a very good insecticidal activity, all insects being dead in 24 hours.

Example 5

Isopropylthiocarbonate of S-diethylaminochlorotriazine was used in a series of tests to determine its fungicidal effectiveness.

These tests were performed using the serial dilution technique on a gelose medium having the following composition:

| | |
|---|---|
| Glucose | g-- 20 |
| Peptone | g-- 6 |
| Yeast extract | g-- 1 |
| Corn steep | g-- 4 |
| NaCl | g-- 0.5 |
| $SO_4Mg \cdot 7H_2O$ | g-- 0.5 |
| $KH_2PO_4$ | g-- 1 |
| $FeSO_4 \cdot 7H_2O$ | mg-- 10 |
| Gelose | g-- 25 |

Distilled water, g.s., 1 liter.

After dissolution of the various substances, the gelose medium was filtered, the pH adjusted to 6.5 with sodium carbonate, and the medium sterilized by heating at 110° C. for 10 minutes. Before seeding with the fungi, the active compound was mixed with the gelose medium at concentrations of 0.05 to 0.5%. Observations were made after 2, 4 and 8 days' culture by comparing the development of the inoculated media with controls without an active compound.

It was observed that this compound, at a concentration of 0.5%, completely stops the development of a fungus such as *Botrytis cinerea* which attacks the young seedlings and brings about the grey rot of bunches of grapes. It is also active against *Alternaria dauci* which mainly attacks the leaves of potatoes and tomatoes. The same technique demonstrates a medium effectiveness at the same concentration against *Poria vaporaria* and *Polystitus sanguineus* which attack and degrade woods.

Example 6

Another series of tests to show the fungicidal effectiveness of the compound of Example 3 was performed on a strict parasite, *Plasmopara viticola* (vine mildew).

Isolated vine leaves taken from hothouse cuttings and maintained alive in boxes the bottom of which was covered with a humid neutral filter paper were used. The active compound was dissolved in acetone, prepared as an aqueous emulsion containing 0.1% by weight of active compound, and sprayed on the leaves. After drying, the leaves were contaminated by spraying with a suspension in bi-distilled water of the parasite.

These tests demonstrate that emulsions containing as little as 0.1% of the isopropylthiocarbonate of S-diethylaminochlorotriazine inhibit the development of the parasite.

In order to confirm this activity, a second series of more severe tests was performed. This second series simulates the intervention of physical factors with spraying of active compound then alternation of artificial rain and of contamination by the parasite. After the active compound was applied, the leaves were contaminated with the parasite. After 1 day, the leaves were sprayed with water to simulate rain, and then re-contaminated.

At a concentration of 0.2% there was a good protection by this compound (which means that there appeared no or few tufts on the leaves) until the fourth contamination and after 12 days of artificial rain.

Example 7

Similar tests performed on strict parasites such as vine mildew (*Plasmopara viticola*) and oidium (*Incinula necator*) without the simulation of physical factors as above have shown fungicidal effectiveness of the isopropylthiocarbonate of S-diisopropylaminochlorotriazine. No phytotoxicity has been observed at the used concentration, between 0.1 and 0.3%, when applied once, the observations being made every day over a period of one week.

Example 8

The serial dilution technique described in Example 5 has been used with seeding by various fungi to show the fungicidal effectiveness of the isopropylthiocarbonate of S-dimethylaminochlorotriazine.

A real polyvalency of this compound has been found by this method showing effectiveness against:

phytopathogenic fungi such as *Fusarium roseum* which attacks the radicular system of numerous plants and in particular graminaceae, *Phytophtora infestans* which develops on Solanum and is more known as potato mildew, *Botrytis cinerea* which attacks young seedlings and brings about the grey rot of bunches of grapes and *Alternaria dauci* which mainly attacks the leaves of potatoes and tomatoes.

lignivorous fungi which degrade woods, such as *Polystitus sanguineus* and *Coriolus versicolor*.

cellulolytic fungi which can degrade textiles, such as *Aspergillus flavus*.

A concentration of 0.5% applied as above completely inhibits each of these parasites.

Experiments performed with this compound have also shown that at concentrations of 0.1–0.5%, the effectiveness against *Plasmopara viticola* is medium to good.

As a general rule, the amounts of alkylthiocarbonate of S-dialylaminohalotriazine to be used vary with the kind of noxious organisms and the desired degree of pesticidal effect. The optimal concentration for a specific action is therefor determined by the man skilled in the art according to the known methods.

From the foregoing description, one skilled in the art can easily ascertain the essential characteristics of this invention, and without departing from the spirit and scope thereof, can make various changes and modifications of the invention to adapt it to various usages and conditions.

In particular, the preceding examples can be repeated with similar success using active agents falling within the general of the compounds of the present invention.

What is claimed is:

1. A thiocarbonic compound of the formula $$RO-COS-C\underset{N}{\overset{N}{\diagdown}}\underset{\underset{X}{|}}{\overset{}{C}}\overset{N}{\diagup}C-N(R')_2$$

wherein X is halogen, R is alkyl of 1–2 carbon atoms, and each R' is alkyl of 1–5 carbon atoms.

2. A compound according to claim 1, wherein X is chlorine.

3. A compound according to claim 1 wherein R is isopropyl.

4. A compound according to claim 5 wherein R' is methyl or ethyl.

5. The isopropylthiocarbonate of S-dimethylamino-chlorotriazine, according to claim 1.

6. A process for preparing a compound according to claim 1, which comprises reacting an alkali-metal alkyl-thiocarbonate of the formula ROCOSM with a dialkyl-aminodihalotriazine of the general formula

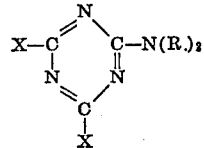

wherein M is an alkali-metal, X is a halogen, R is alkyl group of 1–12 carbon atoms, and R' is alkyl group of 1–5 carbon atoms.

7. A process for preparing a compound according to claim 6 wherein the reaction is effected in an inert organic solvent at up to 50° C.

References Cited
UNITED STATES PATENTS 3,449,342   6/1969   Sakurai et al. _____ 260—249.8

JOHN M. FORD, Primary Examiner

U.S. Cl. X.R.

424—249

UNITED STATES PATENT OFFICE
CERTIFICATE OF CORRECTION

Patent No. 3,780,036  Dated December 18, 1973

Inventor(s) Pierre Prognon, et al.

It is certified that error appears in the above-identified patent and that said Letters Patent are hereby corrected as shown below:

IN THE CLAIMS:

CLAIM 1, COLUMN 6:

The formula should read 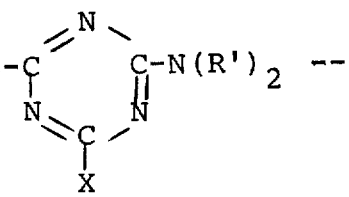

CLAIM 1, COLUMN 6, LINE 3: "1-2" should read -- 1-12 --.

CLAIM 6, COLUMN 7:

The formula should read 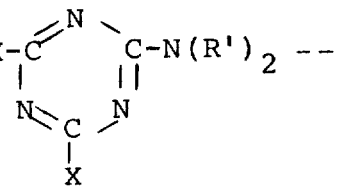

Signed and sealed this 2nd day of July 1974.

(SEAL)
Attest:

EDWARD M. FLETCHER, JR.  
Attesting Officer

C. MARSHALL DANN  
Commissioner of Patents